United States Patent [19]

Nakatani et al.

[11] Patent Number: 5,699,169

[45] Date of Patent: Dec. 16, 1997

[54] IMAGE FORMING APPARATUS WHEREIN DATA IS CONVERTED BETWEEN MULTI-LEVEL DATA AND BI-LEVEL DATA

[75] Inventors: Keiji Nakatani; Masamichi Sugiura, both of Toyokawa; Munehiro Nakatani, Toyohashi; Shigenobu Fukushima, Yokohama, all of Japan

[73] Assignee: Minolta Co., Ltd., Osaka, Japan

[21] Appl. No.: 622,310

[22] Filed: Mar. 27, 1996

Related U.S. Application Data

[63] Continuation of Ser. No. 587,779, Dec. 26, 1995.

[30] Foreign Application Priority Data

| Oct. 3, 1991 | [JP] | Japan | 3-256729 |
| Oct. 3, 1991 | [JP] | Japan | 3-256732 |
| Oct. 3, 1991 | [JP] | Japan | 3-256740 |

[51] Int. Cl.$^6$ .......................... H04N 1/387; H04N 1/41; H04N 1/393
[52] U.S. Cl. .................. 358/298; 358/296; 358/403; 358/426; 358/444; 358/451
[58] Field of Search .................................. 358/298, 296, 358/403, 426, 444, 451

[56] References Cited

U.S. PATENT DOCUMENTS

| 4,505,576 | 3/1985 | Sugiura et al. | 355/14 R |
| 4,748,513 | 5/1988 | Yamada | 358/280 |
| 4,827,352 | 5/1989 | Yaneda et al. | 358/298 X |
| 4,926,268 | 5/1990 | Kawamura et al. | 358/298 X |
| 5,073,966 | 12/1991 | Sato | 358/429 X |
| 5,153,749 | 10/1992 | Katayama | 358/448 |
| 5,165,071 | 11/1992 | Moriya et al. | 358/443 |
| 5,187,592 | 2/1993 | Sguiyama et al. | 358/426 X |
| 5,268,771 | 12/1993 | Murakami et al. | 358/448 |
| 5,282,059 | 1/1994 | Fukushima et al. | 358/456 |
| 5,311,327 | 5/1994 | Fukushima et al. | 358/444 |
| 5,317,416 | 5/1994 | Fukushima et al. | 358/444 |
| 5,333,057 | 7/1994 | Morikawa et al. | 358/296 |

FOREIGN PATENT DOCUMENTS

| 54-126416A | 10/1979 | Japan . |
| 58-75372A | 5/1983 | Japan . |
| 62-107573A | 5/1987 | Japan . |
| 62-114377A | 5/1987 | Japan . |
| 62-114378A | 5/1987 | Japan . |
| 63-11832B2 | 3/1988 | Japan . |
| 2-165775A | 6/1990 | Japan . |
| 3-64783A | 3/1991 | Japan . |
| 3-157060A | 7/1991 | Japan . |
| 2 170 373 | 7/1986 | United Kingdom . |

OTHER PUBLICATIONS

Yoshinobu Mita et al., "Higher Fine Multi–Value Recovery of Binary Image by Nural Network", Japan Hard copy, '90 NIP–24, pp. 233–236, 1990 (English Translation).

Primary Examiner—Eric Frahm
Attorney, Agent, or Firm—Burns, Doane, Swecker & Mathis, LLP

[57] ABSTRACT

In the electronic sort of a digital copying machine, image data of a document consisting of a plurality of sheets are read and compressed to bi-level data in a memory. The compressed image data are recovered to multi-level data successively. When a plurality of copies of the document are produced, the recovery action is repeated by the number of the copies. In a facsimile machine combined with a digital copying machine, bi-level image data for the automatic reduction transmission are recovered first to multi-level image data, and the density of the multi-level image data is changed for the reduction. Then, the multi-level data are converted to bi-level data for facsimile transmission. In a digital two-color copying machine, multi-level image data of the second color of the two colors to be recorded later has to be synchronized to those of the other in correspondence to the delay of the recording time between the two colors. Then, the multi-level image data of the second color are converted to bi-level data in a delay memory in real time, and the bi-level data are read later from the delay memory and recovered to multi-level data.

11 Claims, 11 Drawing Sheets

Fig. 7

IMAGE FORMING APPARATUS WHEREIN DATA IS CONVERTED BETWEEN MULTI-LEVEL DATA AND BI-LEVEL DATA

This application is a continuation of application Ser. No. 08/587,779, filed Dec. 26, 1995.

BACKGROUND OF THE INVENTION

1. Field of the Invention

The present invention relates to a digital image-forming apparatus such as a copying machine or a facsimile wherein the data conversion between multi-level data and bi-level data.

2. Description of Related Art

For a copying machine, a sort for classifying copies is an essential function when a plurality of copies are obtained for a document consisting of a plurality of sheets. Therefore, mechanical sorting with a sorter is provided.

In a digital copying machine, various functions may be provided by using image data stored in a memory. Then, electronic sort is provided (for example Japanese Patent laid open Publication 3-64783/1991). In the electronic sort, when for example a document consisting of three sheets a, b and c of paper is reproduced to get three copies, an image is read first in the order of a, b and c and the image data of the three sheets are compressed to be stored in a memory. Then, the expansion and recording are performed each time in the order of a, b, c, a, b, c, a, b and c. Thus, the copies are sorted electrically without using a mechanical sorter.

In the electronic sort, it is needed to store image data of a document of a plurality of sheets in a memory and to read them from the memory. In a prior art electronic sort, multi-level image data are read and converted to bi-level data, and the bi-level data are compressed and stored in a memory. Then, the compressed bi-level data are expanded and the as-expanded bi-level data are recorded on papers with a printer.

However, if the printer can record a multi-level data, the performance of the printer is not used fully when the as-expanded bi-level data are recorded. Then, it is desirable to improve the performance of the printer in the electronic sort.

On the other hand, an apparatus such as a printer for forming an image with use of a plurality of colors, a plurality of recording devices may be provided each for recording an image of a different color from each other on the same paper. In such an apparatus, the recording of different colors may be synchronized according to the difference of the positions of the recording devices.

A memory for the delay for the synchronization may be used to supply image data of one of such recording devices. However, when the image data are multi-level data, the memory capacity has to be very large in order to store the multi-level image data needed for the delay. For example, if the difference of the positions of the recording devices is 50 mm and the image density is 400 DPI, the delay corresponds to about 800 lines. Then, it is desirable to reduce the memory capacity.

In a copying machine having a facsimile function, the automatic compression of bi-level image data according to the document size is performed on the facsimile transmission. That is, when the transmission starts, the maximum paper size such as A4 size of the facsimile apparatus of the other party is confirmed first. If the maximum paper size is smaller than the document size such as B4 size of the present facsimile apparatus, the density of the image data for the transmission is changed automatically in the facsimile apparatus before the transmission.

In the automatic reduction, the compressed bi-level image data stored in the compressed data memory are expanded to bi-level real image data, and the density of the bi-level data are changed. Then, the bi-level data are compressed again and transmitted. However, in the magnification change processing of bi-level image data, especially for a pseudo-half-tone image, the quality of the obtained image may be degraded or a Moire pattern is created.

On the other hand, in a digital copying machine, the read multi-level image data are subjected to the magnification change processing when the enlargement or reduction of a copy is required.

SUMMARY OF THE INVENTION

An object of the present invention is to provide a digital image forming apparatus which can perform electronic sort with a multi-level data memory.

Another object of the present invention is to provide a facsimile apparatus which can perform the automatic reduction of high quality for a pseudo-half-tone image.

A further object of the present invention is to provide an image forming apparatus which can print with a plurality of colors with multi-level image data.

In one aspect of the present invention, in the electronic sort of a digital copying machine, image data of a document consisting of a plurality of sheets of paper are read and compressed to bi-level data in a memory. When a plurality of copies of the document papers are produced, the compressed image data are recovered to multi-level data successively. The recovery of image data of the plurality of sheets of paper are repeated by the number of copies.

In another aspect of the present invention, in a facsimile apparatus, the compressed bi-level image data for the automatic reduction transmission are recovered to multi-level image data so as to improve the image quality, and the density of the multi-level image data is changed next for the reduction. Then, the multi-level data are converted to bi-level data for facsimile transmission.

In a further aspect of the present invention, in a digital copying machine wherein two colors can be printed, multi-level image data of the second color to be recorded later are synchronized with use of a delay memory to those of the other in correspondence to the delay of the recording time due to the difference of the recording positions of the two recording means each for forming an image with one of the two colors. Image data of the second color are stored in the delay memory after the multi-level image data are converted to bi-level image data in real time. When a two-color image is recorded, the data of the second color are read from the delay memory and recovered to multi-level data.

An advantage of the present invention is that the performance of a digital copying machine can be improved by using the recovery of the compressed image data to multi-level image data.

Another advantage of the present invention is that the automatic reduction in the facsimile transmission of an image of better quality can be performed by using the recovery of the compressed bi-level image data to multi-level image data which are processed next on the density change for the transmission.

A third advantage of the present invention is that the capacity of a delay memory for two-color digital copying machine can be reduced by storing the image data converted to bi-level image data and by recovering to multi-level data on recording.

BRIEF DESCRIPTION OF THE DRAWINGS

These and other objects and features of the present invention will become clear from the following description taken in conjunction with the preferred embodiments thereof with reference to the accompanying drawings, and in which:

Figure 7:
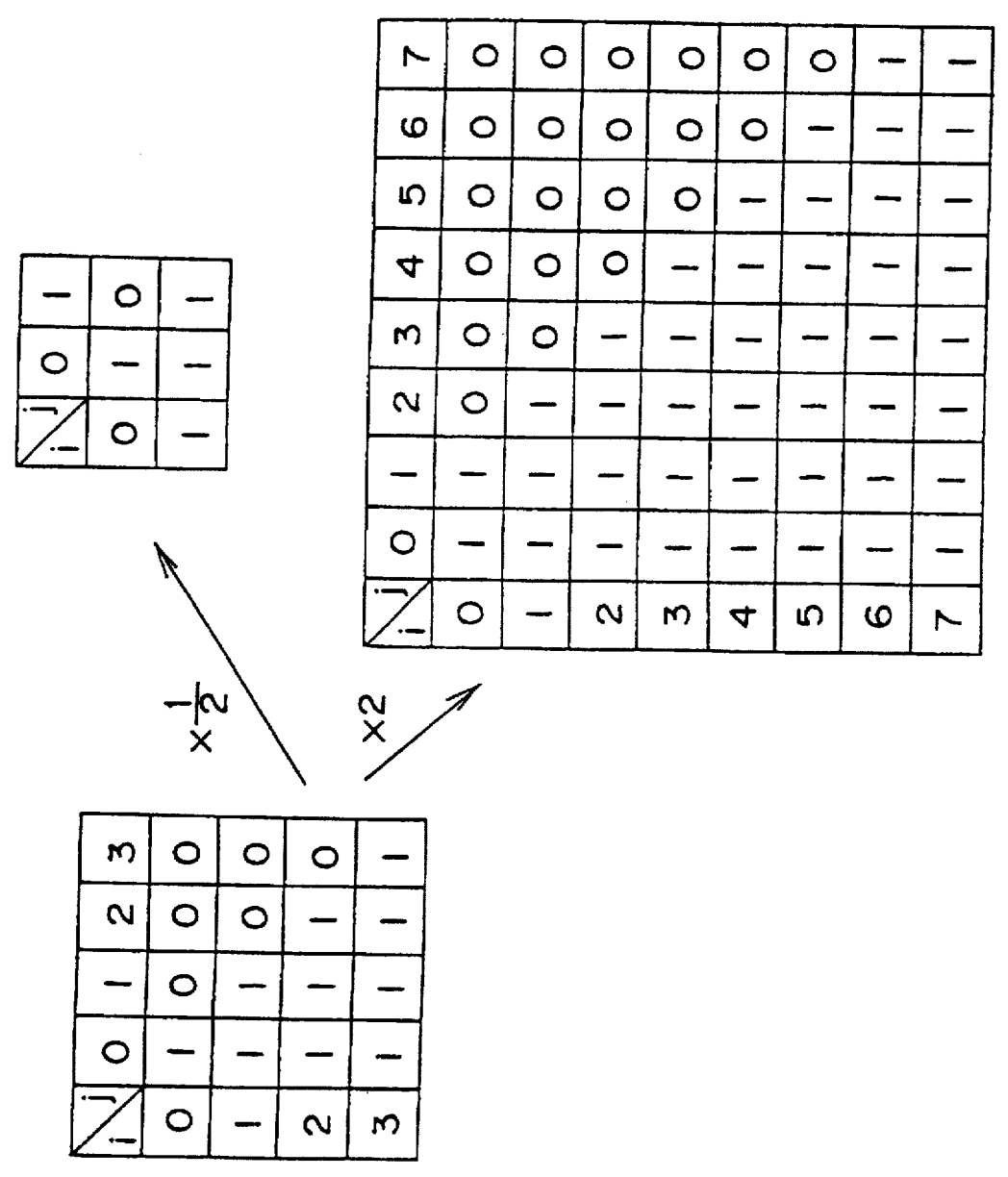

FIG. 7 is a diagram of the density conversion of multi-level data;

DETAILED DESCRIPTION OF THE PREFERRED EMBODIMENTS

Figure 1:
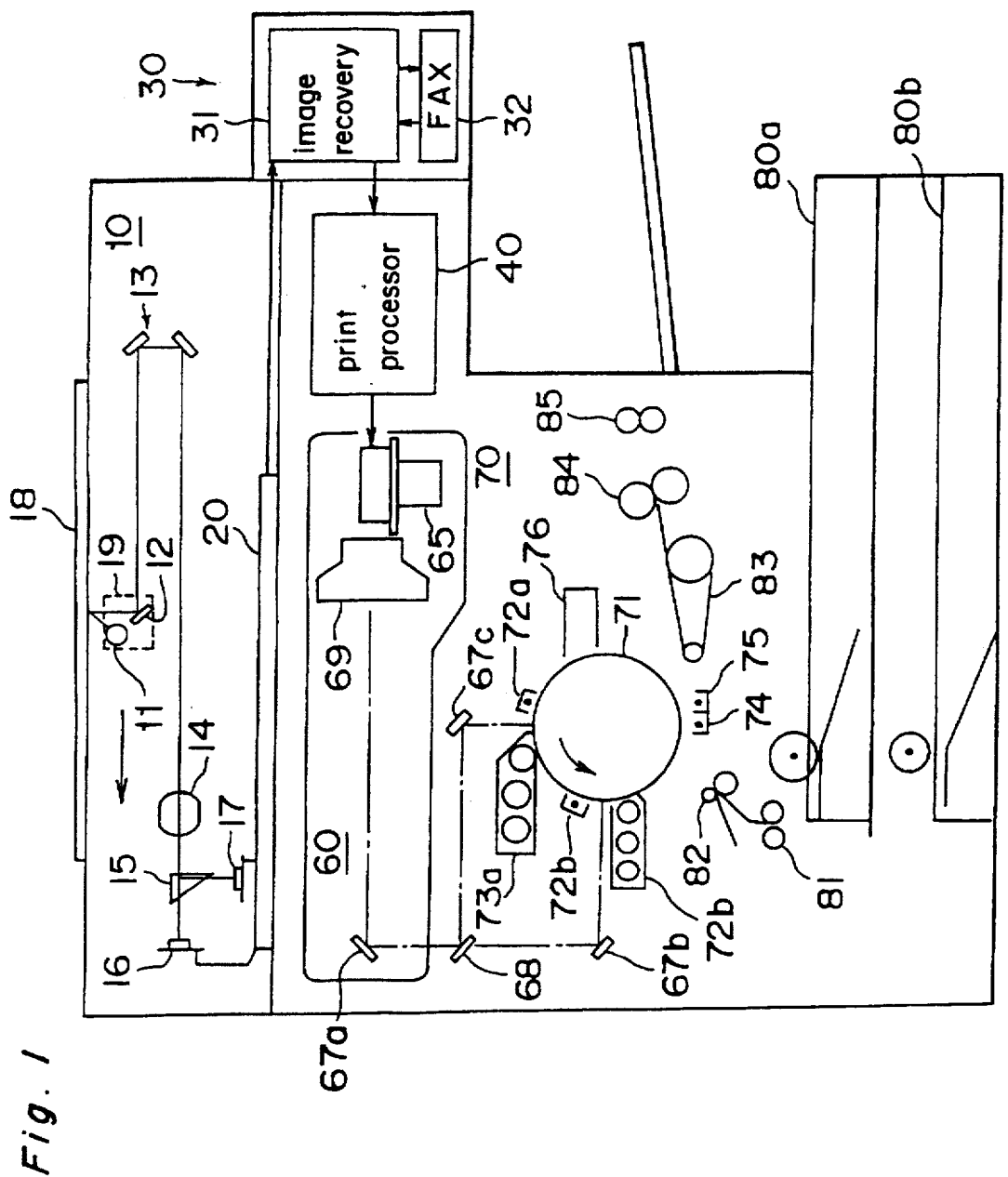
FIG. 1 is a schematic sectional view of a copying machine with a facsimile.

Referring now to the drawings, wherein like reference characters designate like or corresponding parts throughout the several views, FIG. 1 shows a digital two-color copying machine equipped with a facsimile. The printer consists of a scan system 10, an image signal processor 20, a print processor 40, an optical system 60, an image-forming system 70, an operational panel 90 and a facsimile section 30.

In the scan system 10, a document put on a platen glass 18 is illuminated and scanned in order to get the reflected light from the document with linear photoelectric conversion elements (CCD) 16, 17 to supply electric signals. The scan system 10, comprises an exposition lamp 11 for illuminating a document, mirrors 12, 13 for changing the optical path of the reflected light from the document, a lens 14 for collecting the light, a dichroic prism 15 for introducing a specified color (red) and its complementary color for color decision to the two photoelectric conversion elements 16 and 17, and the photoelectric conversion elements 12, 13 for generating electric signals in correspondence to the received light. A scanner 19 carrying the exposition lamp 19 and the mirror 12 moves in parallel with respect to the platen glass 18, and it exposed and scans when it moved in the direction of an arrow displayed in FIG. 1. The photoelectric conversion by the two photoelectric elements 16, 17 is conducted on the specified color and its complementary color, respectively.

The two colors which can be printed in the two-color printer are red and black (that is, red and its complementary color). However, the printing with use of two colors may also be realized for a combination such as black and another color or blue and red.

The image signal processor 20 (shown in detail in FIG. 4) processes the image signals received from the two photoelectric conversion elements 16, 17 to decide the color, that is, the specified color (red) or the other, and it sends the image data with the color data to the facsimile section 30.

In the facsimile section 30 (shown in detail in FIG. 5), the communication function as a facsimile is performed by the facsimile main body 32. Further, an image recovery section 31 is provided to perform the bi-level-to-multi-level conversion and magnification change processing, and the image data with the color data are sent next to the print processor 40.

The print processor 40 receives the image data with the color data of the two colors read at the same time, and divides the image data to the two laser diodes 61, 62 (FIG. 12) according to the image data. When the image data is sent to the second laser diode 62, the print processor 40 delays the image data by the distance between the exposition positions of the two laser diodes 61, 62.

The optical system 60 forms an electrostatic latent image on a photoconductor drum 71 with use of laser beams. The optical system 60 consists of the laser diodes 61, 62 (refer FIG. 12), a driver 63 (refer FIG. 12), a laser head 65 including a collimator lens, a half-mirror for synthesis and a polygon mirror, a lens 69, a mirror 67a, a mirror 68 for isolating two laser beams, and mirrors 67b, 67c in the optical paths for pointing the beams onto the photoconductor drum 71.

The laser diodes 61, 62 are driven by the driver 63 (FIG. 3) to generate laser beams modulated independently according to the image data received from the print processor 40. The laser beams are synthesized by the half mirror in the print head 65. The synthesized laser beam is reflected by the polygon mirror in order to scan the photoconductor drum 71 as a line. The synthesized laser beam deflected by the polygon mirror is collected by the lens 69 so as to focus on the photoconductor drum 71. Then, the beam is reflected by the mirror 67a, and then, it is divided by the isolation mirror 68 into two beams each reaching the photoconductor drum 71 via mirrors 67b, 67c.

The image forming system 70 develops an electrostatic latent image formed by the beams on the photoconductor drum 71 and transfers the developed image to a paper. The image forming system consists of a development and transfer system, a carriage system and a fixing system.

The development and transfer system comprises the photoconductor drum 71, a first charger 72a for sensitizing the surface of the photoconductor drum uniformly, a first development unit 73a including red toners, a second charger 72b for sensitizing the photoconductor drum 71 again for the second exposition, a second development unit 73b including the black image data, a transfer charger 74 for transferring the developed toner image to a paper, and a cleaning unit 76 for removing the toners remained on the photoconductor drum 71 after the transfer. The carriage system feeds and carries a paper for printing, and it comprises paper cassettes 80a, 80b, a paper guide 81 for guiding a paper from the cassettes, a timing roller 82 for giving a timing for carrying a paper to the transfer portion and a belt 83 for carrying a paper to the fixing unit. The fixing unit fixes the toner image on a paper thermally between fixing rollers 84. The fixed paper is carried out by discharge rollers 85 from the machine.

Figure 2:
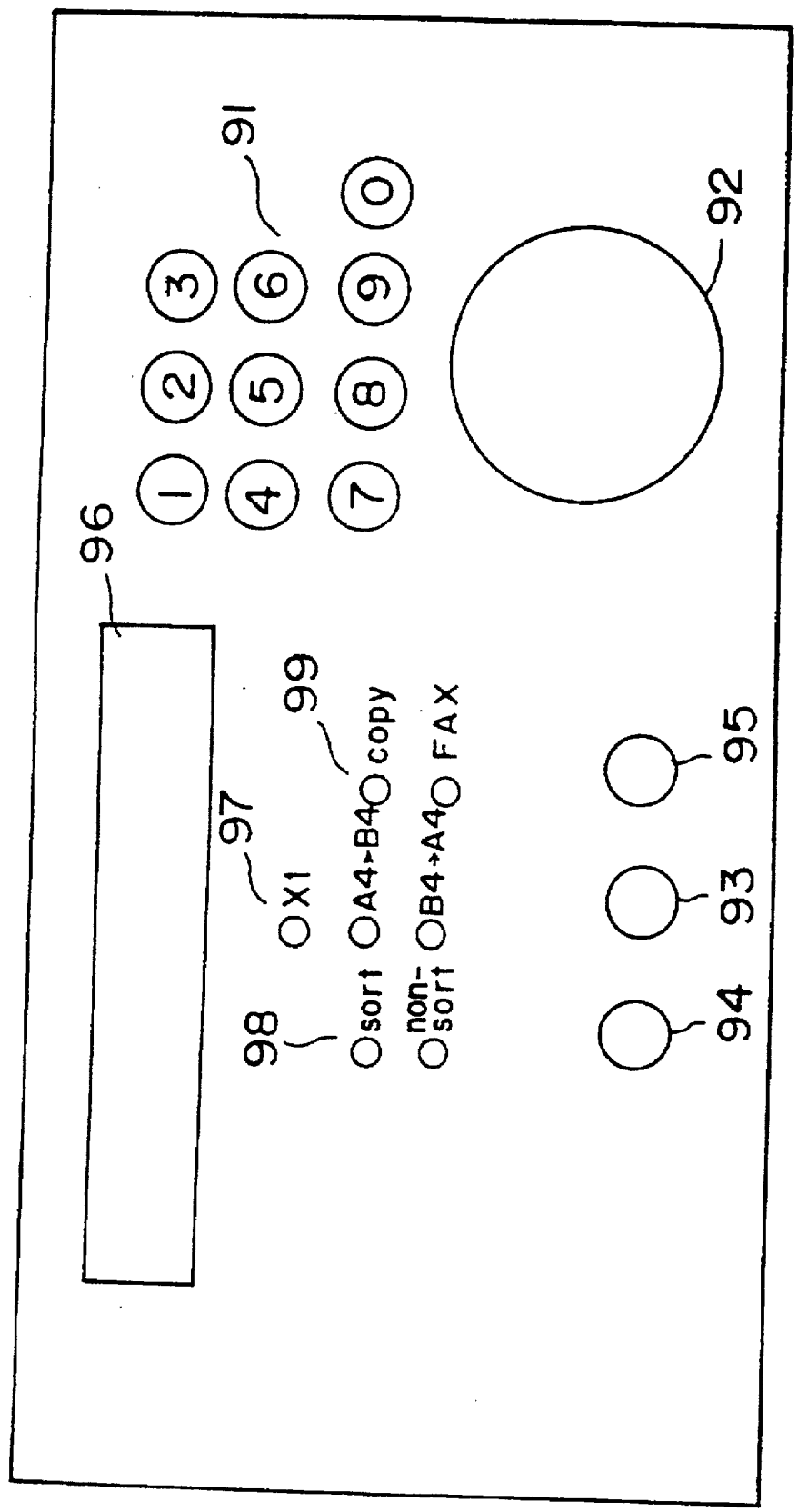
FIG. 2 is a plan view of an operational panel.

As shown in FIG. 2, the operational panel 90 consists of a button section and a display section. The button section includes number buttons 91, a start button 92, a magnification button 93, a sort button 94 and a facsimile mode button 95. The display section includes a display unit 96 for displaying a number or a FAX number and mode display elements 97, 98 and 99 for magnification, sort and copy/FAX.

Figure 3:
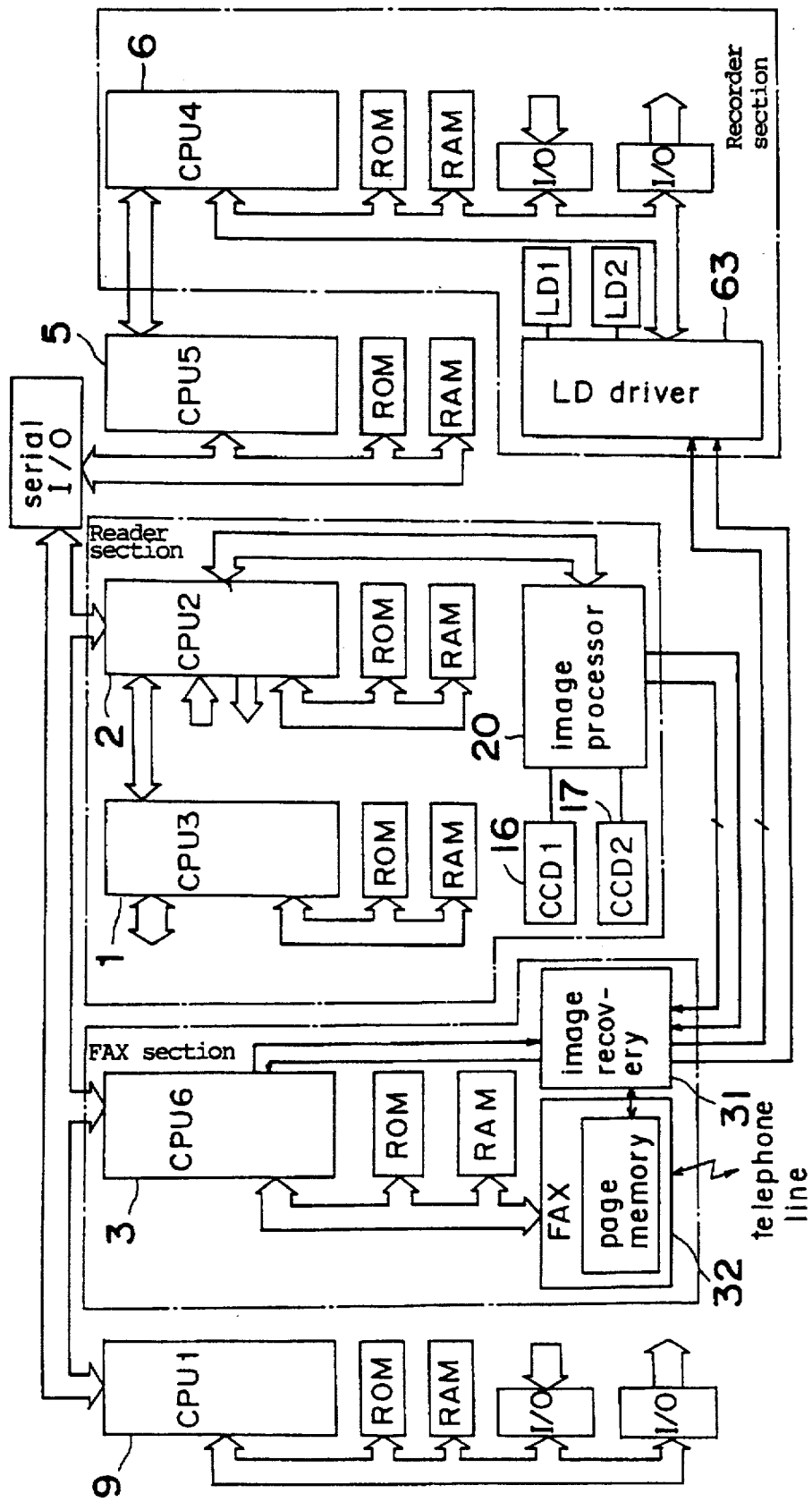
FIG. 3 is a block diagram of a control section.

FIG. 3 shows a control circuit for controlling the copying machine, and the control circuit includes six CPUs each having a system ROM and a system RAM.

The first CPU 9 analyses the signals received from the buttons and ten-keys in the operational panel 90 and the data received via a communication line. It also performs the display in the operational panel 90 and sends the input data.

The second CPU 2 receives image data from the photoelectric conversion elements 16, 17 via the image processor 20 which performs usual image processings such as shading correction, magnification change and dither processing. Further, it decides the color and generates a write signal in correspondence to the development with color (red) toners or black toners. The image data and the color data are sent to the print processor 40.

The third CPU 1 controls the scan system 10.

The fourth CPU 6 controls the recording or imageforming section and the optical system 60. It controls the printing action such as the charging with the first and second chargers 72a, 72b on the photoconductor drum 71, the exposition with the laser diodes 61, 62 with the driver 63 in accordance to the image data generated in cooperation with the print processor 40, the development of toners of a color (red) and black, and the paper feed.

The fifth CPU 5 controls the entire operation of the copying machine. For example, it controls the timings between the CPUs via serial I/O elements or the like and determines the operation mode.

The sixth CPU 3 controls the facsimile section 30 or the communication block. For example, it performs the conversion between image data and code data, the send/receive of the communication protocols and the conversion in the network control unit 139.

Figure 4:
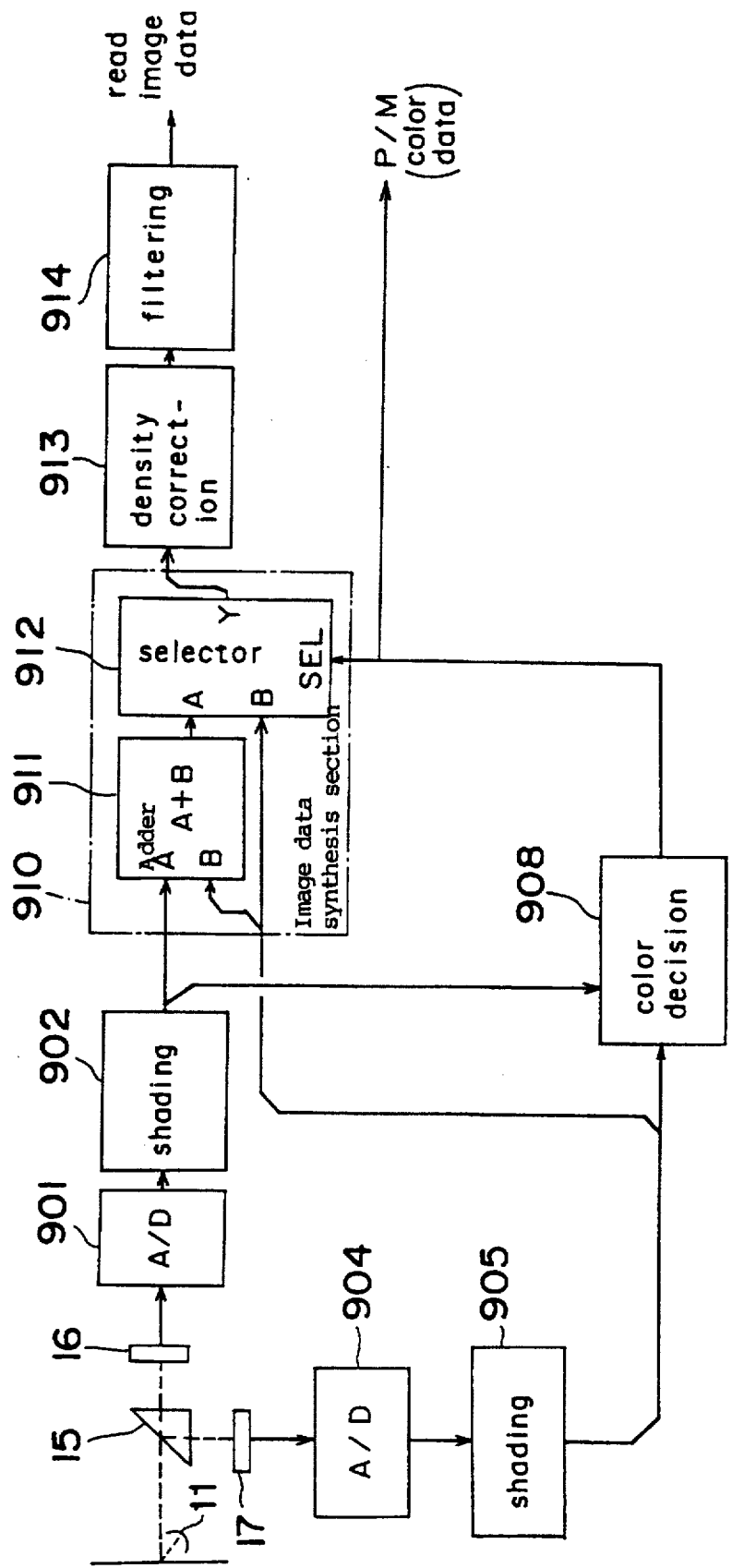
FIG. 4 is a block diagram of an image processor.

Next, the image processor 20 shown in FIG. 4 is explained. In the two color printer of the present embodiment, image data with respect to the specified color (red) and another color are processed to be sent to the image recovery section 31 as read image data.

The light reflected from a document is isolated with the dichroic prism 15 with respect to the two colors to reach the two photoelectric conversion elements or CCDs 16, 17. The photoelectric conversion signals of the specified color and its complementary color detected with the main CCD 16 and the sub-CPU 17 are converted to digital values by the first and second analog processor and A/D converters 901 and 902, respectively, and the digital values are corrected as to the scattering in the main scan direction by the first and second shading correction sections 902 and 905. Next, the image data of the two colors are sent to the color decision section 908, which decides whether the color of a pixel under processing is the specified color (red) or its complementary color. Then, the decided color is inputted to a selection input of the selector 912 in the image data synthesis section 910. On the other hand, the image data of the two colors are sent to the adder 911 in the image data synthesis section 910, and the value (or image data of black) added by the adder is sent to the selector 12 as well as the image data of red. In the image data synthesis section 912, when the color decision section 908 decides that the color is the specified color, the image data of the specified color or the output of the shading correction unit 905 is selected. Otherwise, the color can be takes as black, and the addition of the image data of the specified color and of the complementary color or the output of the adder 911 is selected by the selector 912. Next, the image data selected by the selector 912 according to the color decision are processed by the density correction section 913. Then, the data is processed in the filtering section 914 as to the edge emphasis and the smoothing, and the resultant data are sent as read image data to the image recovery section 31 in the facsimile section 30.

Figure 5:
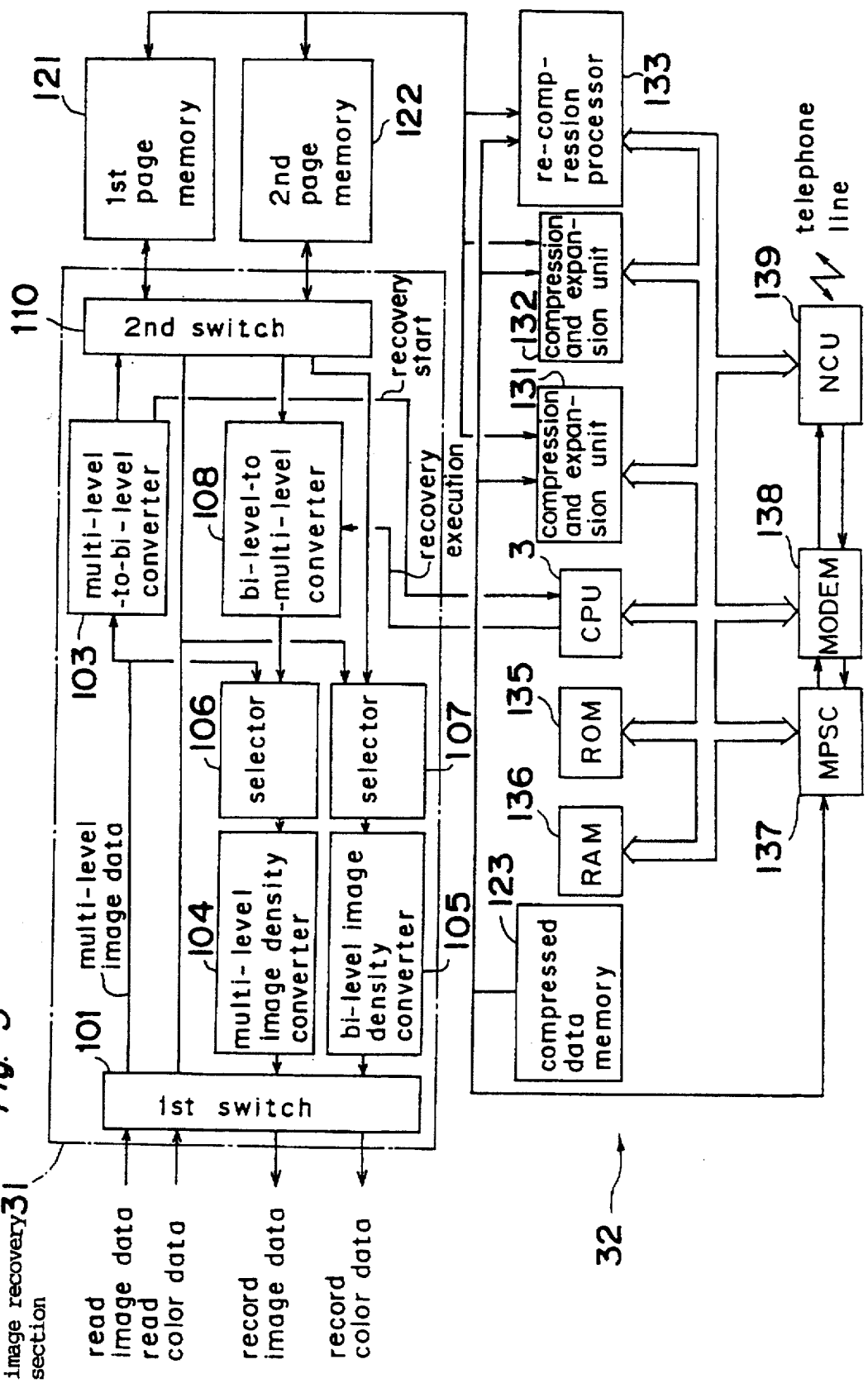
FIG. 5 is a block diagram of a facsimile section.

FIG. 5 shows a block diagram of the facsimile section 30. The facsimile main body 32 performs the usual functions as a facsimile such as communication, compression and expansion, while the image recovery section 31 performs bi-level/multi-level conversion and magnification change to send the image data with color data to the print processor 40. The facsimile section 30 has a characteristic that the flow of image data is controlled by the image recovery section 31.

The structure of the facsimile main body 32 is the same as a usual facsimile.

The image recovery section 31 comprises a multi-level-to-bi-level converter 103 (refer FIG. 8) for converting multi-level data to bi-level data, a bi-level-to-multi-level image density converter 108 for converting the density of bi-level image data to multi-level image data, a multi-level image density converter 104 for converting the density of multi-level image data and a bi-level image density converter 105 for convening the density of bi-level image data. Further, the image recovery section 31 includes first and second switches 101 and 110 and selectors 106 and 107 for selecting data to be sent to the converters 104 and 105.

When a copy operation is performed, the image data flow as explained below. The read image data obtained by the image processor 20 flow through the first switch 101 and the first selector 106 to the multi-level image density converter 104, wherein the density of the image data are converted according to the magnification. Next, the image data is sent to the recording section as record image data.

The read color data obtained in the read section are sent via the first switch 101 and the second selector 107 to the bi-level image density converter 105, wherein the color data is converted as to-the density according to the prescribed magnification, and the color data is sent to the recording section as record color data.

When the magnification is one, the multi-level and bi-level image density converters 104 and 105 perform the processing of the multiplication with one.

When a facsimile transmission is performed, the image data flow as explained below. In the facsimile transmission, the image data are reduced automatically according to the paper size. The present embodiment is characterized in that the density conversion for multi-level image is performed in the automatic reduction after the recovery of bi-level image to multi-level image. Thus, the density conversion of pseudo half-tone bi-level image can be performed at a high image quality.

The read image data obtained by the read section are sent via the first switch 101 to the multi-level-to-bi-level density converter 103, wherein the image data are converted to bi-level image data. The bi-level image data are sent through the second switch 110 and stored in the first page memory 121.

The read color data obtained in the read section are sent through the first switch 101 and the second switch 110 to the second page memory 122 to be stored.

The bi-level image data stored in the first page memory 121 and the read color data stored in the second page memory 122 are compressed by a first compression and expansion unit 131 and are stored in a compressed data memory 123.

After the whole document image data (that is, the compressed bi-level image data and the read color data) are stored in the compressed data memory 123, the network control unit 139 calls the facsimile apparatus of the other party and the communication of the signals is performed according to the procedure of the CCITT recommendation. Then, the document image data are converted in correspondence to the record size of the other party and the compression method obtained in the above-mentioned communication. That is, the compressed bi-level image data in the document image data is expanded again by a re-compression processor 133 into the first and second page memories 121 and 122. If the record size of the other party is smaller than the read document size, the expanded bi-level image data are sent through the second switch 110 to the bi-level-to-multi-level converter 108 to be recovered to the multi-level image. Then, the multi-level image data is sent through the selector 106 to the multi-level density converter 104 to change the density according to the image size in correspondence to the record size of the other party. Then, the image data are sent through the first switch 101 to the multi-level-to-bi-level converter 103 to be converted to bi-level data. Next, the bi-level data are stored again in the second page memory 1-22. If the record size of the other party is the same as or larger than the read size of the read section, the recovery to multi-level image data and the density conversion are not carried out. The bi-level data are compressed again with use of the process determined on the communication by the re-compression processor 133 successively to be stored in the compressed data memory 123. Then, as usual, the compressed data are changed according to the HDLC standard by an MPSC 137, modulated by a MODEM 138 and sent through the network control unit 139 to the communication line.

On the other hand, the compressed color data included in the document image data are transmitted after the transmission of the bi-level image data in unit of page in the present invention. The read color data are expanded by the re-compression processor 133 in the first page memory 121. Then, the color data is sent through the second switch 110 and the selector 107 to the bi-level image density converter 105 to change the density. Next, the data is sent through the first switch 101 and the second switch 110 to be stored in the second page memory 122. The processing thereafter is the same as the bi-level image data.

In the present invention, the magnification processing for multi-level image data on copying operation and the magnification processing for bi-level image data on the automatic compression in the facsimile transmission (to be performed after the conversion to the multi-level image data) are performed by the same magnification processor (that is, the multi-level image density converter 104). Therefore, the magnification section is not needed to be provided doubly.

When facsimile data are received, the image data flow as explained below. On the contrary to the facsimile transmission, the receive image data are sent through the network control unit 139 to the MODEM 138 to be demodulated. Further, the image data are changed according to the HDLC standard by the MPSC 137 and stored in the compressed data memory 123.

After all image data are received, the recording operation starts. That is, the compressed bi-level image data and color data stored in the compressed data memory 123 are expanded by a second compression and expansion unit 132 in the first and second page memories 121 and 122, respectively. The bi-level image data expanded in the first page memory 121 are recovered to multi-level image data by the bi-level-to-multi-level convener 108. Then, the image data are sent through the selector 106, the multi-level image density converter 104 (that is, the magnification processing of the magnification of one) and the first switch 101 to the recording section as record image data. The color data expanded in the second page memory 122 are sent through the second switch 110, the selector 107, the bi-level image density converter 105 (that is, the magnification processing of the magnification of one) and the first switch 101 to the recording section as record color data.

When the memory copy in multi-copy and in electronic sort is performed, the image data flow as explained below. "Memory-copy" means that image data are stored once in a memory and that the copying operation is performed by reading the stored image data. Image data are stored in a memory as a real image (multi-copy) or as compressed (electronic sort).

The storage as real image is performed in multi-copy in order to scan the document only once. In this case, the image data flow as explained below.

Read image data are sent through the first switch 101 to the multi-level-to-bi-level converter 103 to convert them to bi-level image data. Then, the bi-level image data are sent through the first switch 110 to the first page memory 121 to be stored by one page. On the other hand, the read color data are sent through the first and second switches 101, 110 to the second page memory 122 to be stored. After a page of the image data are stored, the CPU 3 receives a recovery start signal (high level for a half-tone document) and the same signal is sent as the recovery execution signal.

The image data stored in the first and second page memories 121, 122 are read for the recording of each paper.

The bi-level image data are sent through the second switch 110 to the bi-level-to-multi-level converter 108 to be converted to multi-level data. The multi-level data are sent through the selector 106 to the multi-level image density converter 104. Then, the image density is changed in correspondence to the magnification and the image data are sent through the first switch 101 to the recording section as record image data. On the other hand, the color data is sent through the second switch 110 and the selector 107 to the bi-level image density converter 105 where the density is changed in correspondence to the magnification. Then, the color data are sent through the first switch 101 to the recording section as record color data.

On the other hand, the storage of the compressed image data in the memory 123 is performed for the electronic sort. In the electronic sort, document image are compressed and stored in the memory, and the recording is performed by reading the stored image data. The image data on the electronic sort flows as explained below.

When a document is read, the read document image data received from the read section are sent through the first switch 101 to the multi-level-to-bi-level converter 103 to be convened to bi-level image data, which are sent through the second switch 110 to the first page memories 121 to be stored. Similarly, the read color data received from the read section are sent through the first and second switches 101, 110 to the second page memories 122 to be stored. After the storage of image data in the first and the second page memories 121 and 122, the recovery signal, which is high level for a half-tone image document, is received by the CPU 3. The image data stored in the first and second page memory 121, 122 are compressed by the first compression and expansion unit 131 to be stored in the compressed data memory 123. This process is repeated by the number of the documents.

When a document is recorded, the data of the first page of the data stored in the compressed data memory 123 are expanded, and the bi-level image data are written in the first page memory 121 and the color data is written in the second page memory 122. Further, the recovery start signal of the first page is sent as a recovery execution signal.

The bi-level image data read from the first page memory 121 are sent through the first switch 110 to the bi-level-to-multi-level converter 108 to be converted to multi-level image data. The image density of the multi-level image data are changed according to the magnification by the multi-level image density converter 104. Then, the image data are sent through the first switch 101 to be sent to the recording section. That is, after the bi-level image data stored in the compressed data memory 123 are expanded to bi-level real image data, the bi-level image data are further recovered to the multi-level image data and recorded. The color data stored in the second page memory 122 are sent through the second switch 110 and the selector 107 to the bi-level image density converter 105 which changed the density according to the magnification. Then, the image data are sent through the first switch 101 to the recording section as record image data. By repeating this process successively by the number of the sheets of the document, a plurality of copies can be sorted.

In this embodiment, when a document is read, the image data of the document are stored at the same time of the recording of the first copy. That is, when the read document image data are sent through the first switch 101 to the multi-level-to-bi-level converter 103, the image data are also sent through the selector 106, the multi-level image density converter 104 and the first switch 101 as the record image data, while when the read color data are sent through the first switch 101 to the second switch 110, the data are also sent through the selector 107, the bi-level image density converter 105 and the first switch 101 as the record color data.

Further, in this embodiment, a multi-level image is converted to a bi-level compressed image by using the compression such as MH or RH after the conversion of the multi-level to the bi-level data, while the expansion from the compressed data to the bi-level data is performed after the expansion such as MH or RH. However, other methods such as ADCT and ADPCM may be used for the compression of multi-level image.

As explained above, in the electronic sort, the recording is performed after the bi-level compressed image data are expanded and converted to the multi-level image data. Therefore, the density conversion is also performed on the multi-level image data. Similarly, in the automatic reduction in the facsimile transmission, the density conversion is performed after the bi-level image data are expanded and converted to the multi-level image data. On the contrary, the prior art density conversion in the electronic sort and in the automatic reduction is performed on the bi-level image data. Then, the quality of the reproduced image is improved in the present embodiment as explained below.

Figure 6:
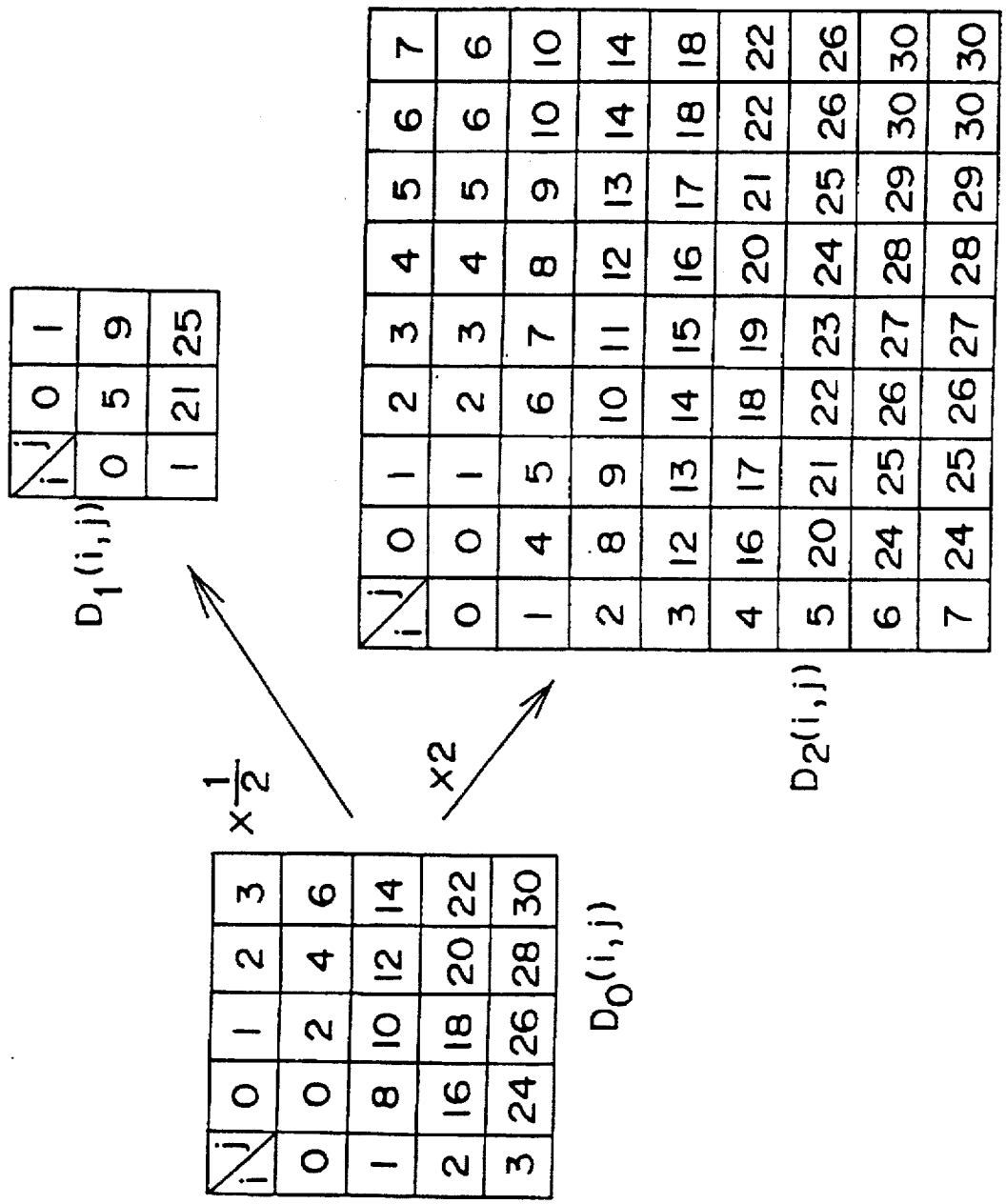
FIG. 6 is a diagram of the reduction and enlargement of data.

FIG. 6 shows an example of the reduction by ½ and the enlargement by 2. In the processing of these cases, the reduction is realized by the smoothing with reference to peripheral pixels. A 4×4 matrix $D_0(i,j)$ (where i, j=0–3) denotes an example of data before the density conversion, while a 2×2 matrix $D_1(i,j)$ (where i, j=0, 1) denotes an example of density reduction data and a 8×8 matrix $D_2(i,j)$ (where i, j=0–7) denotes an example of density expansion data. The number in a matrix element denotes the multi-level image data. In the reduction by ½ of a 4×4 matrix $D_0$ to a 2×2 matrix $D_1$, the following operation is performed:

$D_1(0,0)=\{D_0(0,0)+D_0(0,1)+D_0(1,0)+D_0(1,1)\}/4.$

In the enlargement by 2, the following operations are performed:

$D_2(0,0)=D_0(0,0),$ $D_2(0,1)=\{D_0(0,0)+D_0(0,1)\}/2,$ $D_2(1,0)=\{D_0(0,0)+D_0(1,0)\}/2,$ and $D_2(1,1)=\{D_0(0,0)+D_0(0,1)+D_0(1,0)+D_0(1,1)\}/4.$ On the other hand, FIG. 7 shows comparison examples wherein the reduction by ½ and the expansion by 2 are performed on the bi-level image data. The number in a matrix element denotes the bi-level image data. The bi-level data become also bi-level data after the density conversion. In the reduction by ½, the binarization is needed after the smoothing with peripheral pixels, while in the expansion by 2, the smoothing with use of a suitable logic filter is needed by taking into account the connection state with peripheral elements. With respect to simple bi-level images, it is desirable to take into account the adjacent pixels at most. On the contrary, with respect to pseudo-half-tone images, the processing becomes complicated because pixel data in a wider range have to be taken into account.

These density conversion techniques are known, and it is explained here that the result of the density conversion is different between bi-level and multi-level images. According to the present embodiment, the degradation on image quality can be prevented and Moire patterns are not generated.

Figure 8:
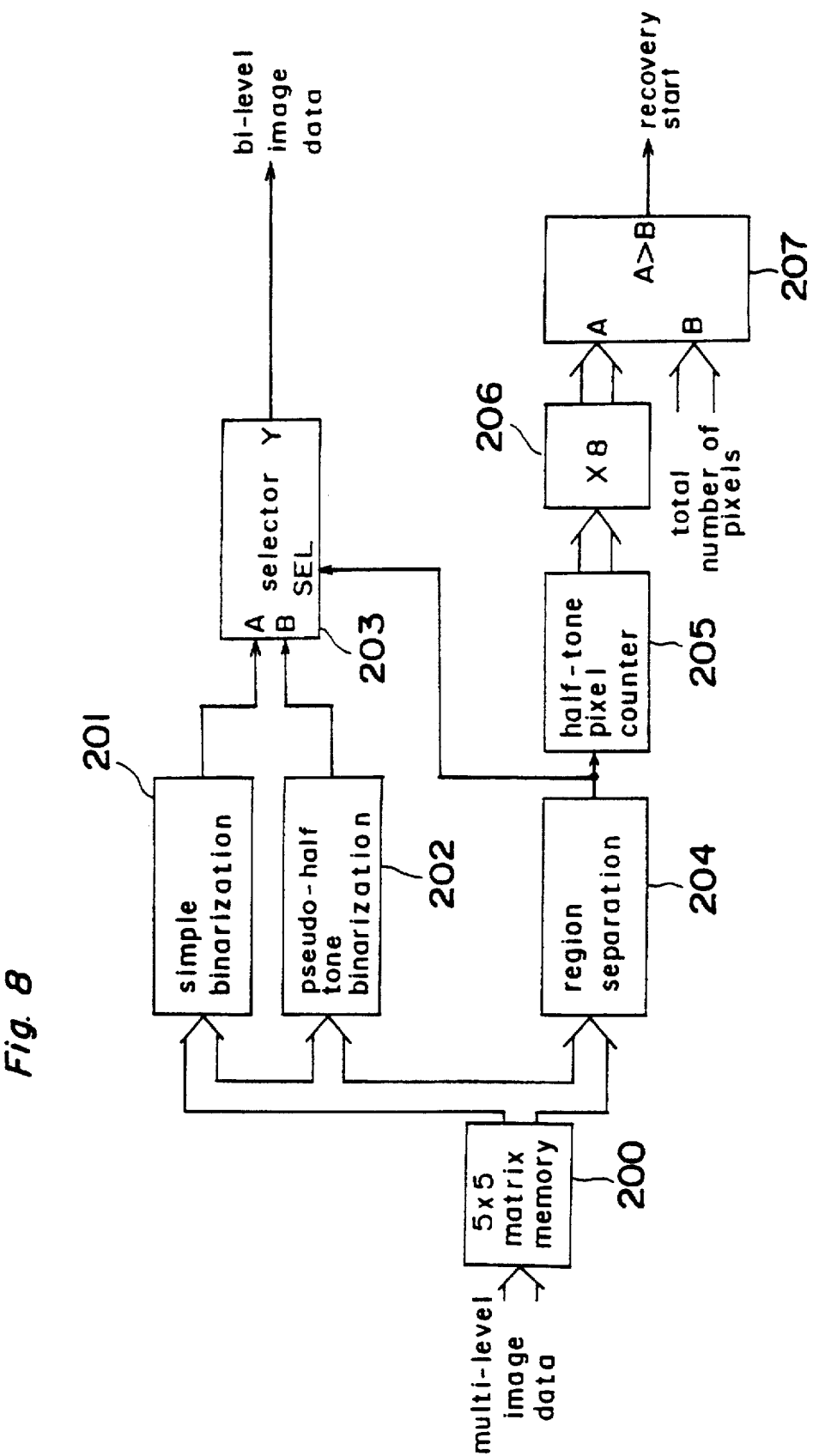
FIG. 8 is a block diagram of a multi-level-to-bi-level converter.
Figures 9, 10:
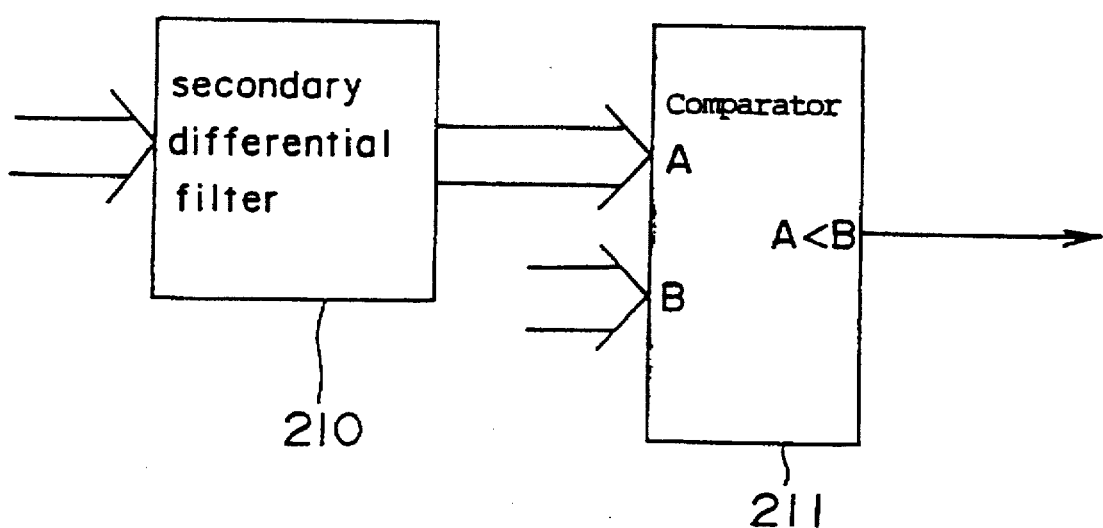
FIG. 9 is a diagram of a second differential filter.
FIG. 10 is a diagram for comparison.

Next, the conversion from multi-level to bi-level is explained. FIG. 8 shows a block diagram of the multi-level-to-bi-level converter 103 in the image recovery section 32. In a region separation section 204, the output of a 5×5 secondary differential (Laplacian) filter 210 shown in FIG. 10 is used. A 5×5 matrix memory 200 stores image data to be converted. As shown in FIG. 10, in the region separation section 204, the output of the secondary differential filter 210 is compared by a comparator 211 with a threshold value. If the output is smaller than the threshold value, the image is taken as a half-tone image, otherwise the image is taken not as a half-tone image. Thus, the decision on the half-tone image can be given for each pixel.

In a simple binarization section 201 in the multi-level-to-bi-level converter 103 in FIG. 8, a multi-level image data is binarized simply with a constant threshold value by assuming that the multi-level image data is a non-half-tone image such as a character.

In a pseudo-half-tone binarization section 202, a multi-level image data is binarized as a pseudo-half-tone image such as a photograph by assuming that the data is a half-tone image data. These binarized image data are selected by a selector 203 according to the output of the region separation section 204 which sends bi-level image data. If the output of the region separation section 204 is half-tone, the output of the pseudo-half-tone binarization section 202 is selected by the selector 203.

On the other hand, the output of the region separation section 204 is counted by a half-tone pixel counter 205 in the unit of page. If the count times eight (the output of a multiplier 206) is larger than the total pixel number of a page or if the count is larger than an eighth the total pixel number, a selector 207 determines that a half-tone region exists, and a recovery start signal is set to be the high level. When a recovery start signal is received by the CPU 3, a recovery execution signal is generated by the CPU 3 according to the recovery start signal to be sent to the bi-level-to-multi-level converter 108 (FIG. 5).

Figure 11:
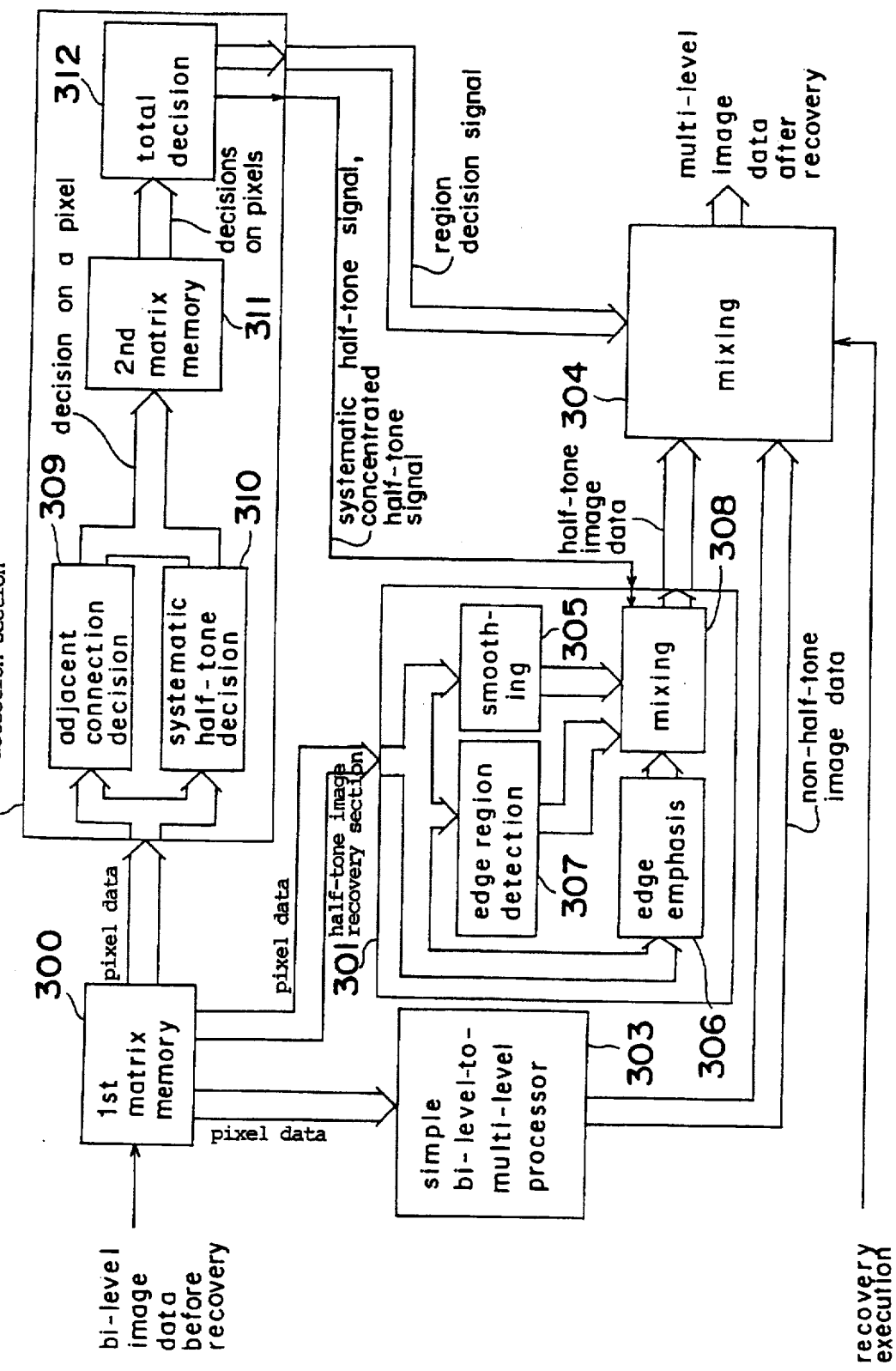
FIG. 11 is a block diagram of a bi-level-to-multi-level converter.

Next, the conversion from bi-level to multi-level is explained here. FIG. 11 shows a block diagram of the bi-level-to-multi-level converter 108 in the image recovery section 32. Recovered bi-level image data are sent to the first matrix memory 300 which stores pixel data of a matrix of fifteen pixels in the main scan direction and of eighteen pixels in the subscan direction. The stored data are subjected to the processings of half-tone recovery, region detection and simple binarization by a half-tone recovery section 301, a region detection section 302 and a simple bi-level-to-multi-level converter 303, respectively. In the half-tone recovery section 301, the data of pixels of a matrix consisting of fifteen pixels in the main scan direction and fifteen pixels in the subscan direction are referred, while in a region detection section 302, the data of pixels of a matrix consisting of twelve pixels in the main scan direction and twelve pixels in the subscan direction are referred. The size of the first matrix memory 300 is larger in the subscan direction because the pixel to be processed shifts between the half tone recovery section 301 and the region detection section 302 by five pixels in the subscan direction. In the simple bi-level-to-multi-level converter 303, bi-level pixel data of black or white is converted simply to the data of black or white in the multi-level representation.

In the half-tone image recovery section 301, a plurality of bi-level image data is used to recover a multi-level image data on the basis of bi-level image data according to a prescribed method. It includes a smoothing section 305 for obtaining a smoothing component, an edge emphasis section 306 for obtaining an edge emphasis component, and an edge region detection section 307 for deciding if the pixel exists in an edge region. The outputs of the three blocks 305-307 are used to recover multi-level image data in a mixing section 308.

In the region detection section 302, it is decided if the pixel to be processed belongs to a non-half-tone region or to a half-tone region. In order to perform the decision, an adjacent connection decision section 309 and a systematic half-tone decision section 310 determine decision values for each pixel, and they are stored in a second matrix memory 31. A total decision section 312 generates a final multi-level region decision signal by using decision values of pixels of a matrix consisting of nine pixels in the main scan direction and seventeen pixels in the subscan direction.

According to the final region decision signal, a half-tone and non-half-tone data mixing section 304 mixes the output (half-tone data) of the half-tone image recovery section 301 with the output (non-half-tone data) of the simple bi-level-to-multi-level converter 303 to get multi-level image data after recovery.

If the recovery execution signal sent by the CPU 3 is the low level, only non-half-tone data are selected. The low level of the recovery execution signal means that the recovery start signal for the document image is the low level. Then, a prescribed amount of half-tone region does not exist, so that it is better to record simply as bi-level data without recovering to multi-level data.

Next, the drive of two diode laser 61, 62 is explained below. In the two-color printer of the present invention, the printing of two colors, red and black, is carried out. The image data sent by the image recovery section 31 is received by the laser driver 63 which controls the laser diodes 16 and 17 according to the image data. First, the laser diode 16 for red is driven according to the red image data. Next, the other laser diode 17 is driven according to the black image data. The black data is delayed because it is necessary that the development unit 73b in the down stream side has to supply black toners to avoid the problem of color mixing.

Figure 12:
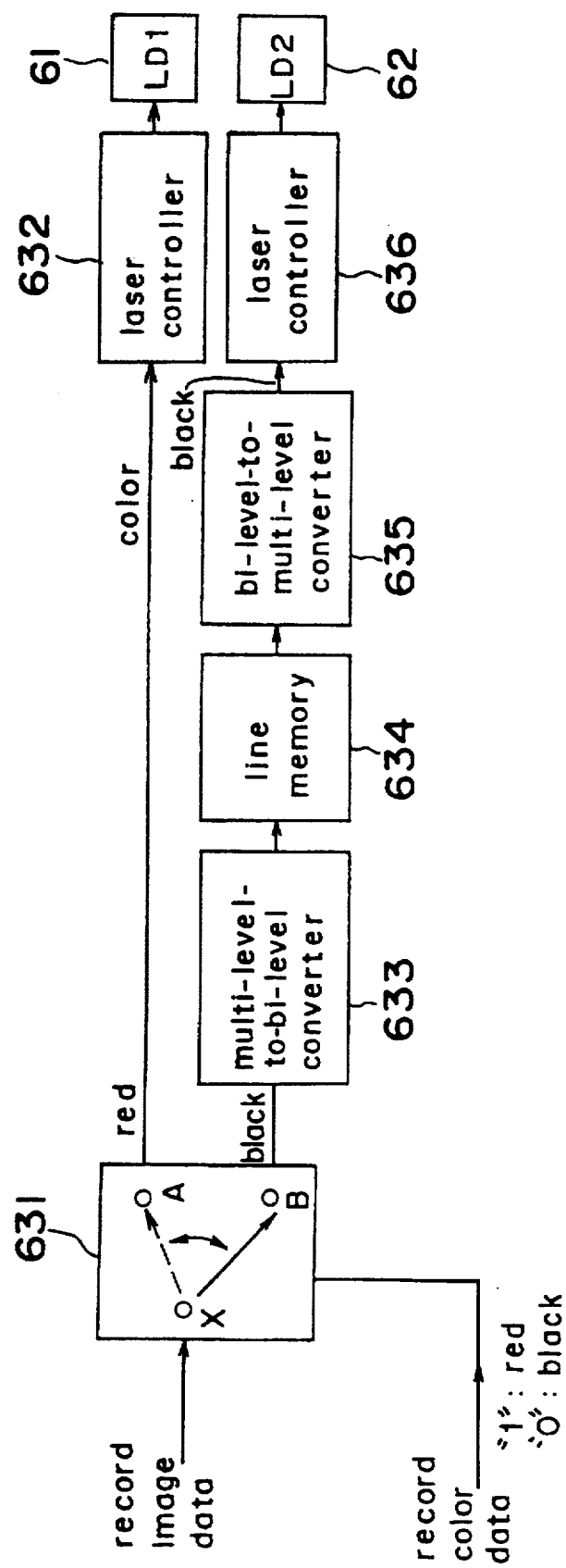
FIG. 12 is a block diagram of a driver circuit for a laser diode in the recording section.

FIG. 12 shows a block diagram of the laser driver 63. The record image data are divided into red image data and black image data by a color separation section 631 according to the record color data signal. If the record color data is "1" (red), the input data X (record image data) as received is sent as the output A, while the output B is zero. On the other hand, if the record color data is "0" (black), the input X is sent from the output B to a multi-level-to-bi-level converter 633, while the output A is zero.

Because the black image data sent from the output B have to be delayed by a prescribed number of lines, it is stored once in a line memory 634 as a FIFO memory in real time. Though the black image data is a multi-level data, it is converted to a bi-level data by the multi-level-to-bi-level converter 633. Then, the data are stored in the line memory 634. The line memory 634 has the capacity of the number of lines in correspondence to the shift of the position when the first laser diode 16 and the second diode 17 reaches the photoconductor drum surface in the subscan direction. In the main scan direction, the line memory has to store the number of the pixels in the line on which the laser beams scan. The bi-level image data sent from the line memory 634 for delay are recovered again to multi-level data by a bi-level-to-multi-level converter 635 in real time to be sent to a laser controller 636.

The image data are stored in the line memory 634 after converted to bi-level data to reduce the memory capacity because the memory capacity is required to be too large to store the as received multi-level data. For example, if the multi-level image data is an 8-bit data, the capacity can be reduced by ⅛.

The red data and the delayed black data are inputted to the laser controllers 632 and 636, respectively, to drive the first and second laser diodes 61 and 62.

The compressed image data may not be bi-level image data if the compression and expansion processing can be performed in real time.

It is to be noted that the second multi-level-to-bi-level converter 633 and the second bi-level-to-multi-level converter 635 are substantially the same as the first multi-level-to-bi-level converter 103 and the second bi-level-to-multi-level converter 108 in the image recovery section 31.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. An image forming method comprising the steps of:
   (a) reading images of a document having a plurality of pages and generating multi-level image data for each page;
   (b) converting the generated multi-level image data to bi-level image data which represents black or white;
   (c) storing the converted bi-level image data for the plurality of pages;
   (d) successively reading the stored bi-level image data for each page from said memory means and recovering the read data to multi-level image data;

(e) printing an image on a sheet of paper for each page in accordance with the recovered multi-level image data; and (f) repeating steps (d) and (e) a prescribed number of times.

2. The image forming method according to claim 1, wherein the plurality of pages are electronically sorted by repeating steps (d) and (e) a prescribed number of times.

3. An image processing method comprising the steps of:

reading each pixel of a document image and generating multi-level image data;

converting the multi-level image data to bi-level image data;

storing the bi-level image data;

converting the stored bi-level image data to multi-level image data;

magnification change means for changing a number of pixels of the converted multi-level image data so as to change a size of the image; and converting the changed multi-level image data to bi-level image data.

4. An image forming apparatus comprising:

input means for inputting multi-level image data;

a recording medium for storing an image;

first recording means for recording an image on said recording medium according to the multi-level image data input by said input means;

second recording means, provided separately from said first recording means by a prescribed distance, for recording an image on said recording medium according to the multi-level image data input by said input means;

move means for moving said recording medium relative to said first and second recording means;

first supply means for supplying the multi-level image data inputted by said input means to said first recording means;

conversion means for converting the multi-level image data inputted by said input means to bi-level image data;

memory means for storing the converted bi-level image data for a prescribed time and for sending the bi-level image data after the prescribed time passes;

recovery means for converting said bi-level image data stored in said memory means to multi-level image data; and second supply means for supplying the multi-level image data converted by said recovery means to said second recording means.

5. An image forming apparatus including a first recording means for forming an image of a first color and a second recording means for forming an image of a second color over the image of the first color, said image forming apparatus comprising:

input means for inputting first and second multi-level image data;

first supply means for supplying the first multi-level image data inputted by said input means to the first recording means; and second supply means for supplying the second multi-level image data inputted by said input means to the second recording means when a prescribed time passes after the supply of the image data to the first recording means by said first supply means;

said second supply means comprises conversion means for converting the multi-level image data inputted by said input means to bi-level image data; memory means for storing the converted bi-level image data for the prescribed time and for sending the converted bi-level image data after the prescribed time passes; and recovery means for reconverting the converted bi-level image data to multi-level image data on the basis of the converted bi-level data sent by said memory means.

6. An image processing apparatus for use with electronic sorting comprising:

input means for inputting a multi-level image data which represents the image density detected with respect to each pixel of an image;

conversion means for converting the multi-level image data of each pixel inputted by said input means to bi-level image data which represents black or white;

memory means for storing the bi-level image data converted by said conversion means for a plurality of pages of a document;

recovery means for successively converting the bi-level image data for the plurality of pages stored in said memory means to multi-level image data; and means for controlling said recovery means to repeat a successive conversion a prescribed number of times so that copies of the image are electronically sorted when printed.

7. The image processing apparatus according to claim 1, further comprising print means for recording a multi-level gradation data for each pixel of an image on a sheet of paper for each of said plurality of pages in correspondence with the multi-level image data converted by said recovery means.

8. The image processing apparatus according to claim 7, further comprising receive means for receiving bi-level image data sent from a remote transmitter, wherein when said receive means receives the bi-level image data, said recovery means converts the received image data to multi-level image data.

9. An image processing apparatus for use with electronic sorting comprising:

read means for optically reading images of a document having a plurality of pages and generating multi-level image data corresponding to an image density of each pixel of an image;

conversion means for converting each of the multi-level image data generated by said read means to bi-level image data which represents black or white;

memory means for storing the bi-level image data for the plurality of pages converted by said conversion means;

recovery means for successively converting the bi-level image data for the plurality of pages stored in said memory means to multi-level image data; and means for controlling said recovery means to repeat a successive conversion a prescribed number of times so that copies of the image are electronically sorted when printed.

10. The image processing apparatus according to claim 9, further comprising print means for recording a multi-level gradation data for each pixel of an image on a sheet of paper for each of said plurality of pages in correspondence with the multi-level image data converted by said recovery means.

11. An image forming apparatus for electronic sorting comprising:

read means for reading images of a document having a plurality of pages and generating multi-level image data for each page;

conversion means for converting the multi-level image data generated by said read means to bi-level image data which represents black or white;

memory means for storing the bi-level image data for the plurality of pages converted by said conversion means;

recovery means for successively converting the bi-level image data for the plurality of pages stored in said memory means to multi-level image data;

print means for recording a multi-level gradation data for each pixel of an image on a sheet of paper for each of said plurality of pages in accordance with the multi-level image data converted by said recovery means;

input means for inputting a number of copies to be reproduced; and control means for controlling said recovery means and said print means so that recovery action and print action are repeated in accordance with the number inputted by said input means in order to electronically sort copies of the image.

* * * * *

UNITED STATES PATENT AND TRADEMARK OFFICE
CERTIFICATE OF CORRECTION

PATENT NO. : 5,699,169

DATED : December 16, 1997

INVENTOR(S) : Keiji NAKATANI, et al.

It is certified that error appears in the above-indentified patent and that said Letters Patent is hereby corrected as shown below:

On the title page,

In Section [63], after "1995" the following is inserted:

which is a Continuation of Ser. No. 955,028, Oct. 1, 1992, now abandoned

Signed and Sealed this

Twenty-third Day of June, 1998

*Attest:*

BRUCE LEHMAN

*Attesting Officer*  *Commissioner of Patents and Trademarks*